Sept. 6, 1955  E. BLETZ  2,717,289

WIDE RANGE THERMOSTAT

Filed Dec. 17, 1952

INVENTOR.

BY EDWARD BLETZ

Woodling and Kroot,
attys.

United States Patent Office 2,717,289
Patented Sept. 6, 1955

2,717,289
WIDE RANGE THERMOSTAT

Edward Bletz, Lexington, Ohio, assignor to Stevens Manufacturing Company, Inc., a corporation of Ohio Application December 17, 1952, Serial No. 326,503

16 Claims. (Cl. 200—138)

The invention relates in general to thermostats and more particularly to a resilient member in a thermostat which may have a wide range of adjustment. This application is a continuation-in-part of my application Serial No. 207,382, filed January 23, 1951, now Pat. No. 2,692,317, entitled Snap-Acting Thermostat wherein a resilient strip member co-operates in a thermostat with a snap-acting strip member. In such prior art form of snap-acting thermostat a bimetallic strip urged one end of a first strip in a first direction and an adjustable screw urged the middle of the first strip in the opposite direction. The adjustable screw established the operating temperature for opening and closing contacts carried on the first strip and on a snap-acting strip. When the adjusting screw was adjusted for a temperature near the upper temperature limit of the thermostat and the electrical device controlled by such thermostat reached such temperature, the first strip would have a considerable deflection. Then if the adjusting screw were adjusted for a temperature near the lower temperature limit of the thermostat, the first strip would have an even greater deflection which approached the elastic limit of such first strip, especially under the high ambient temperature conditions of the thermostat. This great stress applied to the first strip under high temperature conditions would in many cases establish a permanent set in this first strip so that upon subsequent return to the high temperature operating conditions of the thermostat, the calibration of the thermostat was found to be in error by from ten to thirty degrees compared with the former calibration.

An object of the present invention is therefore to provide a thermostat structure which will retain the original calibration throughout the life of the thermostat and despite changes in the adjustment of the adjusting screw at any and all operating temperatures.

Another object of the invention is to provide a thermostat which is adjustable in operating temperature over a wide range.

Still another object of the invention is to provide a thermostat which has a wide range of temperature settings and which may be set for one extreme of the operating range when the ambient temperature is at the other extreme of the operating range without damage to the thermostat and further without change in the calibration of the thermostat.

Another object of the invention is to provide a thermostat having a composite resilient member.

Still another object of the invention is to provide a thermostat having first and second portions on a resilient member.

Still another object of the invention is to provide a thermostat having a secondary resilient deflectable member attached to a primary resilient deflectable member.

Still another object of the invention is to provide a thermostat which includes a secondary resilient deflectable member on a strip which is subjected to plural load forces.

Other objects and a fuller understanding of this invention may be had by referring to the following description and claims, taken in conjunction with the accompanyings, in which:

Figure 1 is a side view like Figure 4 but with the ambient temperature at the upper temperature limit;

Figure 1:
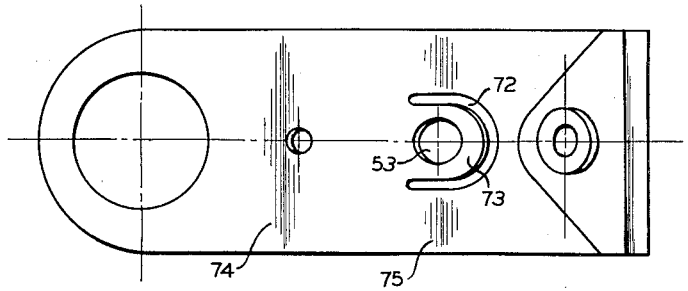
Figure 1 is a plan view of a resilient strip used in the thermostat.

The Figures 3 to 6 show a side view of the complete thermostat which includes a base 15 and a stack 16. A nut 17 is fastened to the base 15, and this nut includes a stop portion 18. An adjustable screw 20 is threadable in the nut 17, and this screw carries a stop lug 22 for co-operation with the stop portion 18. The screw 20 carries an insulating tip 23 which is adjusted axially by rotation of the screw 20.

The stack 16 carries an over center spring member 24, a flexible contact strip 71, and a flexible bimetallic strip 26. A terminal 27 is carried in the stack 16 and is in electrical contact with the spring member 24, and a terminal 28 is likewise carried in the stack in electrical contact with the flexible contact strip 71. A hollow rivet 29 holds together the stack 16 which includes insulating washers 30 between the various strips.

The over center spring member 24 includes a compression spring strip 32 and a tension spring strip 33 to make this over center spring member 24 a snap-acting device which will snap to alternate positions on either side of a neutral center position.

The spring member 24 carries a contact 40, and the flexible contact strip 71 carries a contact 41 for co-operation with the contact 40. The flexible contact strip 71 is provided with a U-shaped portion 42 which has a threaded aperture 43. An adjusting screw 44 is threaded in the aperture 43 and carries an insulating tip 45 for establishing the spacing between contacts 40 and 41 in the off position thereof. An insulating button 46 is carried by the flexible bimetallic strip 26 and is positioned to abut the under side of the contact strip 71 to urge same upwardly for ambient temperature changes in a given direction.

Figure 4:
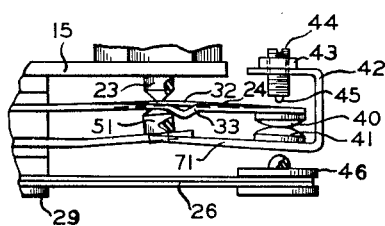
Figure 4 is similar to Figure 3 but shows the temperature at an upper temperature limit.

The flexible contact strip 71 is provided with a small aperture 53. A tongue 52 is provided on an insulating spacer 51. This tongue 52 is receivable within the aperture 53 with the insulating spacer 51 positioned between the flexible contact strip 71 and the compression spring strip 32. The insulating spacer 51 has sufficient height to bear against the under side of the compression spring strip 32 and bow the same upwardly even though the insulating tip 23 is raised to its upper limit as shown in Figure 4.

Figure 2:
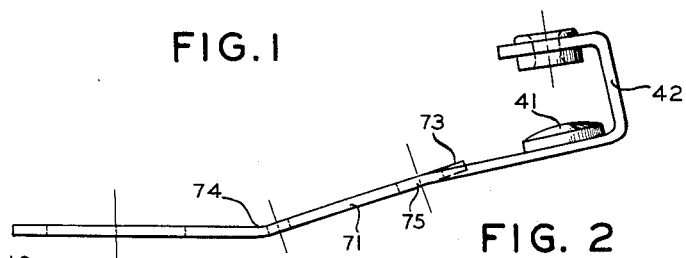
Figure 2 is a side view of the strip of Figure 1.

The Figures 1 and 2 show the flexible contact strip 71 as it is manufactured and ready to be fastened in the stack 16 as part of the complete thermostat. This strip 71 has a curved slot 72 positioned toward the contact and surrounding approximately 200° of arc of the aperture 53. The slot 72 and the aperture 53 establish a U-shaped resilient member 73. The strip 71 as best seen in Figure 2 is bent in a given direction to a permanent set of approximately 15° along a line 74 adjacent the mounting end of the strip 71. The contact strip 71 is further bent in the opposite direction to a permanent set of approximately 5° along the line 75 which substantially intersects the aperture 53. Such last mentioned permanent set does not include the U-shaped resilient member 73 as best seen in Figure 2.

*Operation*

Figure 3:
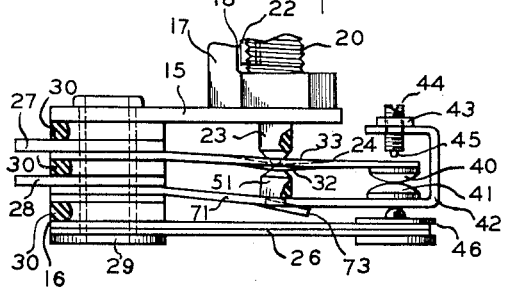
Figure 3 is a side view of a complete thermostat incorporating the strip of Figures 1 and 2 and set at a low operating temperature.

The Figure 3 shows the thermostat adjusted for a low temperature near the low limit of operation of the thermostat. In this position the insulating tip 23 is axially moved downward by the adjustable screw 20. The insulating tip 23 acts through the compression spring strip 32 directly upon the insulating spacer 51 and thus bows downwardly the contact strip 71. The contacts 40 and 41 are shown in their closed position.

The Figure 4 shows the thermostat with the insulating tip 23 moved upwardly to establish the thermostat near the upper limit of the operating range. In this position the natural resiliency of the contact strip 71 causes it to be bowed upwardly holding the insulating spacer 51 against the compression spring strip 32. The contacts 40 and 41 are again shown in their closed position. Further, the bimetallic strip 26 is shown in the undeflected position as it would be for room temperature conditions.

Figure 5:
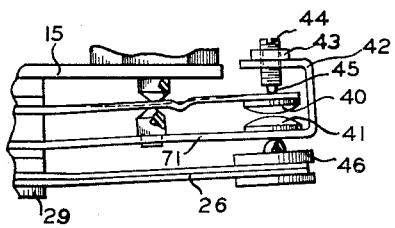

The Figure 5 shows the thermostat adjusted for the same temperature as in Figure 4; however, the bimetallic strip 26 is now shown in its heated position with the contacts 40 and 41 open. This thermostat could be used in an electrical appliance such as a flatiron which would have an operating temperature range, for example, from 70° F. to 550° F. With the terminals 27 and 28 connected to a source of electrical energy and the heating element of the flatiron and with the thermostat within the flatiron, the ambient temperature of the thermostat could be between 70° F. and 550° F. The Figure 5 shows the thermostat with the bimetallic strip 26 deflected as by heat of approximately 550° F. It would be noted that the contact strip 71 is bent upwardly at the end into a considerable curvature.

Figure 6:
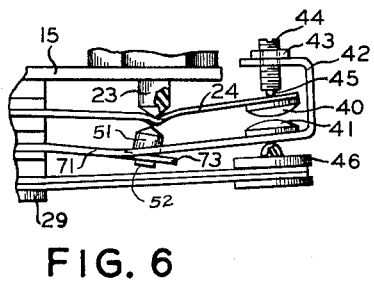
Figure 6 is a side view like Figure 3 but with the thermostat readjusted for a low operating temperature.

The Figure 6 shows the thermostat still under ambient temperature conditions of 550° F. but with the adjusting screw 20 readjusted by the operator to a position near the low operating temperature limit. Figure 6 thus shows that with the insulating tip 23 moved downwardly the contact strip 71 is bowed even more than in Figure 5. The U-shaped resilient member 73 is now deflected below the plane of the contact strip 71 rather than being deflected above as in Figure 2. The prior art form of thermostat was found to have the calibration thereof destroyed by a change of adjustment in the adjusting screw such as that shown in the change from Figure 5 to Figure 6. With the incorporation of the U-shaped resilient member axial adjustments of the insulating tip 23 cause flexing of the resilient member 73 which will in turn transmit it to the contact strip 71. With this resilient member 73, which may be considered a secondary resilient member, attached to the primary resilient member 71, the thermostat may be adjusted from a high operating temperature to a low operating temperature with the ambient at a high temperature without damage to the thermostat and without change in the calibration of the thermostat. The U-shaped slot 51 also relieves the stress in the contact strip 71 when it is greatly deflected or bent by the insulating tip 23. Both the primary resilient member 71 and secondary resilient member 73 are flexible strips or members which may be called "creep-action" members, that is, they have a generally linear relationship of force versus deflection.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a thermostat, a primary resilient member having first, second, and third portions, said first portion adapted to be fastened in said thermostat, a secondary resilient member integral with the second portion of said primary member, said secondary member adapted to be deflected in a first direction to thus bend said primary member about said first portion, said third portion of said primary member adapted to be deflected in the opposite direction to bend same substantially at said second portion.

2. A contact carrying blade for a thermostat, comprising, a resilient strip of metal having a mounting end and a contact end, said mounting end adapted to be fastened in a stack of a thermostat for co-operation therewith, said strip having a weakened portion to thus define a U-shaped secondary resilient member at the mid-portion of said strip, said U-shaped member adapted to be abutted by an adjustable member to place an adjustable load in a first direction on said U-shaped member to bend same and thus bend said strip about said mounting end, said contact end of said strip adapted to have an adjustable load placed thereon in an opposite direction to bend said strip substantially at said adjustable member.

3. A contact carrying blade for a thermostat, comprising, a resilient strip of metal having a mounting end and a contact end, said mounting end adapted to be fastened in a stack of a thermostat for co-operation therewith, a U-shaped secondary resilient member at the mid-portion of said strip defined by a U-shaped slot, said U-shaped member adapted to be abutted by an adjustable member to place an adjustable load in a first direction on said U-shaped member to bend same and thus bend said strip about said mounting end, said contact end of said strip adapted to have an adjustable load placed thereon in an opposite direction to bend said strip substantially at said adjustable member.

4. A contact carrying blade for a thermostat, comprising, a resilient strip of metal having a mounting end and a contact end, said mounting end adapted to be fastened in a stack of a thermostat for co-operation therewith, a U-shaped secondary resilient member at the mid-portion of said strip defined by a U-shaped slot and extending toward said contact end, said U-shaped member adapted to be abutted by an adjustable member to place an adjustable load on said U-shaped member in a first direction to bend said U-shaped member and thus bend said strip about said mounting end, said contact end of said strip adapted to have an adjustable load placed thereon in the opposite direction with the fulcrum of said strip being substantially at said adjustable member.

5. A contact carrying blade for a thermostat, comprising, a resilient strip of metal having a mounting end and a contact end, said mounting end adapted to be fastened in a stack of a thermostat for co-operation therewith, said strip being bent in a first direction to a permanent set of a small angle along a first line adjacent said mounting end, a U-shaped secondary resilient member at the mid-portion of said strip defined by a U-shaped slot and extending toward said contact end, said strip being bent in the opposite direction to a permanent set of a second small angle along a second line at about the mid-point of said strip, said last mentioned permanent set excluding said U-shaped member, said U-shaped member adapted to be abutted by an adjustable member to place an adjustable load on said U-shaped member in said opposite direction to bend said U-shaped member about said second line and thus bend said strip about said first line, said contact end of said strip adapted to have an adjustable load placed thereon in said first direction with the fulcrum of said strip being substantially at said second line.

6. A contact carrying blade for a thermostat, comprising, a resilient strip of metal having a mounting end and a contact end, said mounting end adapted to be fastened in a stack of a thermostat for co-operation therewith, said strip being bent in a first direction to a permanent set of a small angle along a first line adjacent said mounting end, a circular aperture in the mid-portion of said strip adapted to receive and position the tongue of an insulator spacer button, said strip having a U-shaped slot surrounding approximately one half of said aperture and positioned substantially symmetrically on the side of said aperture toward said contact end, a U-shaped secondary resilient member lying between said aperture and said slot, said strip being bent in the opposite direction to a permanent set of a second small angle along a second line at about said aperture, said last mentioned permanent set excluding said U-shaped member, said spacer button adapted to be abutted by an adjustable member to place an adjustable load on said U-shaped member in said opposite direction to bend said U-shaped member substantially about said second line and thus bend said strip about said first line, said contact end of said strip adapted to have an adjustable load placed thereon in said first direction with the fulcrum of said strip being substantially at said second line.

7. A contact carrying blade for a thermostat, comprising, a resilient strip of metal having a mounting end and a contact end, said mounting end adapted to be fastened in a stack of a thermostat for co-operation therewith, said strip being bent in a first direction to a permanent set of approximately 15° along a first line adjacent said mounting end, a circular aperture in the mid-portion of said strip adapted to receive and position the tongue of an insulator spacer button, said strip having a U-shaped slot surrounding approximately 200° of said aperture and positioned symmetrically on the side of said aperture toward said contact end, a U-shaped secondary resilient member lying between said aperture and said slot, said strip being bent in the opposite direction to a permanent set of approximately 5° along a second line at about said aperture, said last mentioned permanent set excluding said U-shaped member, said spacer button adapted to be abutted by an adjustable member to place an adjustable load on said U-shaped member in said opposite direction to bend said U-shaped member about said second line and thus bend said strip about said first line, said contact end of said strip adapted to have an adjustable load placed thereon in said first direction with the fulcrum of said strip being substantially at said second line.

8. A thermostat including a base, a resilient strip having a fixed end carried by said base, a contact end on said strip opposite said fixed end, temperature responsive means to engage and deflect said contact end in a given direction, a secondary resilient member connected to said strip, and adjustable means on said thermostat disposed to deflect said secondary resilient member of said strip in the opposite direction and hence deflect said strip.

9. A thermostat including a base, a resilient strip having a fixed end carried by said base, a contact end on said strip opposite said fixed end, bimetallic means to engage and deflect said contact end in a given direction, a secondary resilient member on said strip at about the mid-point thereof, both said strip and said member having a generally linear relationship of force versus deflection, adjustable means on said thermostat disposed to deflect said secondary resilient member of said strip in the opposite direction, said secondary resilient member upon deflection causing deflection to a lesser degree of said strip.

10. A thermostat including a base, a resilient strip having a fixed end carried by said base, a contact end on said strip opposite said fixed end, bimetallic means to deflect said contact end in a given direction, a secondary resilient member on said strip at about the mid-point thereof, adjustable means on said thermostat disposed to deflect said secondary resilient member of said strip in the opposite direction, said secondary resilient member upon deflection causing deflection to a lesser degree of said strip, said secondary resilient member being formed integrally with said strip by a curved slot in said strip.

11. A thermostat including a base, a primary resilient member having a fixed end carried by said base, a contact end on said member, temperature responsive means to deflect said contact end in a given direction, a secondary resilient member attached to said primary member intermediate said ends, a third member having a fixed end carried by said base, spacer means disposed between said third member and said secondary resilient member, and means to deflect said third member in the opposite direction and hence deflect said secondary resilient member and thus said primary resilient member.

12. A thermostat including a base, a resilient strip having a fixed end carried by said base, a contact end on said strip, temperature responsive means to deflect said contact end in a given direction, a secondary resilient member on said strip at about the mid-point thereof, a second strip having a fixed end carried by said base, spacer means disposed between said second strip and said secondary resilient member, and adjustable means on said thermostat disposed to deflect said second strip in the opposite direction and hence deflect said secondary resilient member and thus said resilient strip.

13. A thermostat including a base, a resilient strip having a fixed end carried by said base, a contact end on said strip opposite said fixed end, means to deflect said contact end in a given direction, a secondary resilient member on said strip at about the mid-point thereof, a second strip having a fixed end carried by said base, spacer means disposed between said second strip and said secondary resilient member, adjustable means on said thermostat disposed to deflect said second strip in the opposite direction and hence deflect said secondary resilient member, said secondary resilient member upon deflection causing deflection to a lesser degree of said resilient strip, and said secondary resilient member being formed integrally with said strip by a curved slot in said resilient strip.

14. A thermostat including a base, a resilient strip having a fixed end carried by said base, a contact end on said strip opposite said fixed end, bimetallic means to deflect said contact end in a given direction, a secondary resilient member on said strip at about the mid-point thereof, a snap acting second strip having a fixed end carried by said base, a contact end on said second strip positioned to electrically contact the contact end of said resilient strip, rigid spacer means disposed between a mid-portion of said second strip and said secondary resilient member, adjustable means on said thermostat disposed to deflect the mid-portion of said second strip in the opposite direction and hence directly deflect said secondary resilient member, said secondary resilient member upon deflection causing deflection to a lesser degree of said resilient strip, and said secondary resilient member being formed integrally with said strip by a curved slot in said resilient strip.

15. In a thermostat, a resilient strip of metal having a mounting end and a working end, said mounting end adapted to be fastened in a stack of a thermostat for co-operation therewith, a secondary resilient member connected to said strip, both said strip and said member having a generally linear relationship of force versus deflection, first means to deflect said secondary member in a first direction and thus deflect said strip in said first direction about said mounting end, and second means to deflect the working end of said strip in the opposite direction to thus deflect said strip in said opposite direction about said mounting end.

16. In a thermostat, a resilient strip of metal having a mounting end and a contact end, said mounting end adapted to be fastened in a stack of a thermostat for co-operation therewith, a secondary resilient member connected generally at the mid-portion of said strip, both said strip and said member having a generally linear relationship of force versus deflection, said secondary resilient member adapted to be abutted by an adjustable member to place an adjustable load on said secondary member in a first direction to bend said secondary member and thus bend said strip about said mounting end, said contact end of said strip adapted to have an adjustable load placed thereon in the opposite direction with the fulcrum of said strip being substantially at said adjustable member.

References Cited in the file of this patent

UNITED STATES PATENTS 2,440,025    Singleton _____ Apr. 20, 1948